(12) United States Patent
Spencer et al.

(10) Patent No.: US 11,142,350 B2
(45) Date of Patent: Oct. 12, 2021

(54) COMPACT SCALABLE DRAG SAIL DEPLOYMENT ASSEMBLY

(71) Applicant: Purdue Research Foundation, West Lafayette, IN (US)

(72) Inventors: David Allen Spencer, West Lafayette, IN (US); Anthony George Cofer, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 168 days.

(21) Appl. No.: 16/662,989

(22) Filed: Oct. 24, 2019

(65) Prior Publication Data

US 2020/0130872 A1    Apr. 30, 2020

Related U.S. Application Data

(60) Provisional application No. 62/749,786, filed on Oct. 24, 2018.

(51) Int. Cl.
*B64G 1/62* (2006.01)
*B64G 1/22* (2006.01)

(52) U.S. Cl.
CPC ............ *B64G 1/62* (2013.01); *B64G 1/222* (2013.01)

(58) Field of Classification Search
CPC ......... B64G 1/62; B64G 1/222; B64G 1/1078
See application file for complete search history.

(56) References Cited

U.S. PATENT DOCUMENTS

| | | | |
|---|---|---|---|
| 7,669,802 B2 | 3/2010 | Dorman | |
| 9,863,148 B2* | 1/2018 | Fernandez | B29C 65/48 |
| 10,160,555 B2* | 12/2018 | Turse | B64G 1/222 |
| 10,763,569 B2* | 9/2020 | Harvey | H01Q 15/161 |
| 2017/0298628 A1* | 10/2017 | Rakow | E04C 3/005 |

(Continued)

OTHER PUBLICATIONS

Long, Alexandra C. and David A. Spencer, Stability of a Deployable Drag Device for Small Satellite Deorbit, SPACE Conferences and Exposition 2016, The American Institute of Aeronautics and Astronautics, Inc.

(Continued)

*Primary Examiner* — Brian M O'Hara
(74) *Attorney, Agent, or Firm* — Maginot, Moore & Beck, LLP

(57) ABSTRACT

A drag sail deployment assembly has an enclosure supporting four boom deployment assemblies and four retractable booms. Each boom deployment assembly includes a hub and motor. The hub is configured to hold a wound boom and to rotatably pay out the wound boom. The motor is disposed at least in part within an interior of the hub, and rotates the hub. Each boom is associated with a corresponding one of the four boom deployment assemblies. Each boom includes a plurality of spring elements disposed within a sleeve. Each boom is wound onto the hub of the corresponding boom deployment assembly in a first configuration wherein the spring elements are compressed toward each other. Each boom is configured to expand into a second configuration wherein central portions of the spring elements are spaced apart from each other when the boom is unwound from the hub of the corresponding boom deployment assembly.

16 Claims, 9 Drawing Sheets

(56) References Cited

U.S. PATENT DOCUMENTS

2020/0122864 A1* 4/2020 Murphey ................ E04C 3/005
2020/0324921 A1* 10/2020 Straubel ................ B64G 1/222

OTHER PUBLICATIONS

Long, Alexandra C., Development of a Passively Stable Pyramid Sail to Deorbit Small Satellites, Georgia Institute of Technology, Aug. 2018.
Guglielmo, D. et al., Drag Deorbit Device: A New Standard Reentry Actuator for CubeSats, Journal of Spacecraft and Rockets, Jan.-Feb. 2019, vol. 56, No. 1.

* cited by examiner

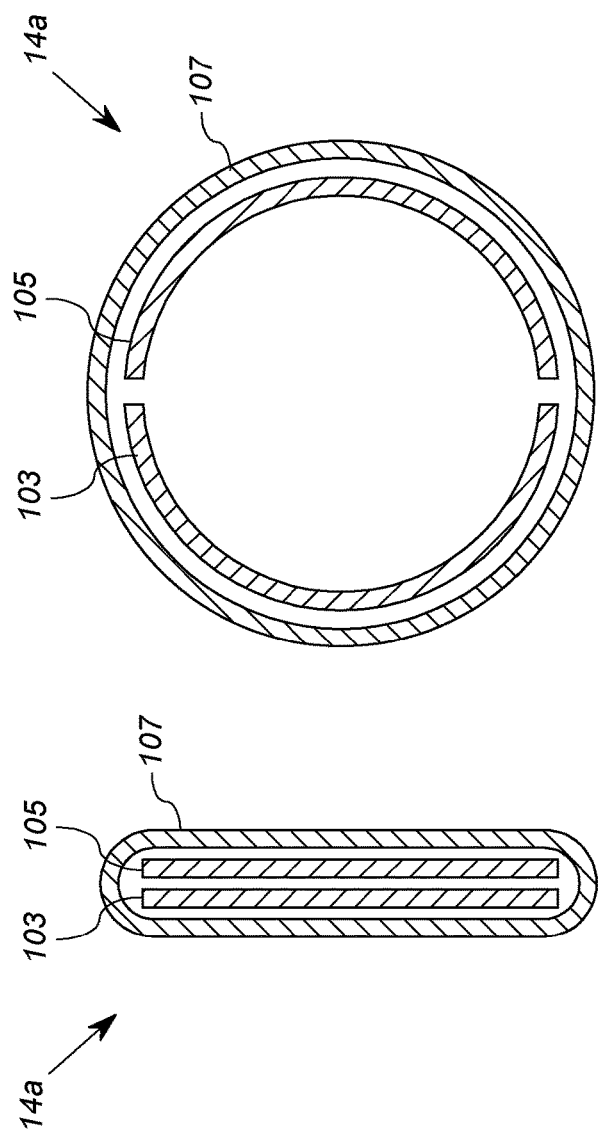
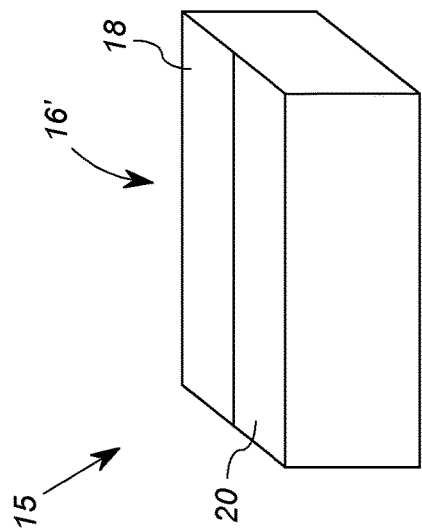

COMPACT SCALABLE DRAG SAIL DEPLOYMENT ASSEMBLY

This application claims the benefit of U.S. Provisional Patent Application Ser. No. 62/749,786, filed Oct. 24, 2018, which is incorporated in its entirety by reference herein.

FIELD OF THE INVENTION

The present invention relates generally to orbital satellites, and more specifically to de-orbit systems used in orbital satellites.

BACKGROUND

The recent trend toward CubeSats and small satellite missions has led to a proliferation of space objects. A consequence of such proliferation is that orbital debris has been a growing problem in low-Earth orbits. The number of satellites has crossed a threshold of critical density where the number of debris objects will grow exponentially due to collisions unless actively mitigated. The most recent Nano/Microsatellite Market Forecast compiled by Spaceworks states that there was a 205% increase in the number of satellites with masses of 1-50 kg launched in 2017 over 2016. They estimate 2,600 nanosatellites and microsatellites will be launched in the next 5 years.

To reduce the problem of orbital debris, satellites can be designed to de-orbit at the end of their useful life. There is a need for a standardized system that can be scaled based upon size and orbit of the host satellite to ensure de-orbit of the system a reasonable number of years after the end-of-mission.

There are at least four commercial small satellite constellations planned to provide global internet service, each consisting hundreds to thousands of satellites in low earth orbit (LEO) at altitudes ranges from 1,000 km to 1,325 km. The need to de-orbit these satellites at the end of their operational lifetime is apparent since the satellites would otherwise take more than 100 years to de-orbit naturally.

It is known to employ a drag sail assembly that deploys at the beginning of the de-orbit process. The drag sail assembly includes a drag sail that, properly designed, can significantly reduce the amount of de-orbit time. While many experimental drag sail assemblies have shown promise, a viable, scalable system that may be used with both small and large satellites has not yet been developed.

SUMMARY OF THE INVENTION

At least some embodiments discussed herein address the need for a viable and scalable drag sail assembly.

A first embodiment is a drag sail deployment assembly having an enclosure supporting four boom deployment assemblies and four retractable booms. Each boom deployment assembly includes a hub and motor. The hub is configured to hold a wound boom and to rotatably pay out the wound boom. The hub has a hollow interior. The motor is disposed at least in part within the hollow interior, and is operably coupled to rotate the hub. Each boom is associated with a corresponding one of the four boom deployment assemblies. Each boom includes a plurality of spring elements disposed within a sleeve. Each boom is wound onto the hub of the corresponding boom deployment assembly in a first configuration wherein the spring elements are compressed toward each other. Each boom is configured to expand into a second configuration wherein central portions of the spring elements are spaced apart from each other when the boom is unwound from the hub of the corresponding boom deployment assembly.

The resulting assembly is configured for use with a plurality of sail sections forming a drag sail capable of de-orbiting a satellite. The resulting assembly can be scaled for different size satellites and different sized sails.

The above-described features and advantages, as well as others, will become more readily apparent to those of ordinary skill in the art by reference to the following detailed description and accompanying drawings.

BRIEF DESCRIPTION OF THE DRAWINGS

FIG. 3A shows a cutaway view of a boom of the drag sail assembly of FIG. 1 in a first configuration;

FIG. 3B shows a cutaway view of a boom of the drag sail assembly of FIG. 1 in a second configuration;

FIG. 4 shows a perspective view of an alternative embodiment of the housing that may be used in the drag sail assembly of FIG. 1;

DETAILED DESCRIPTION

Figure 1:
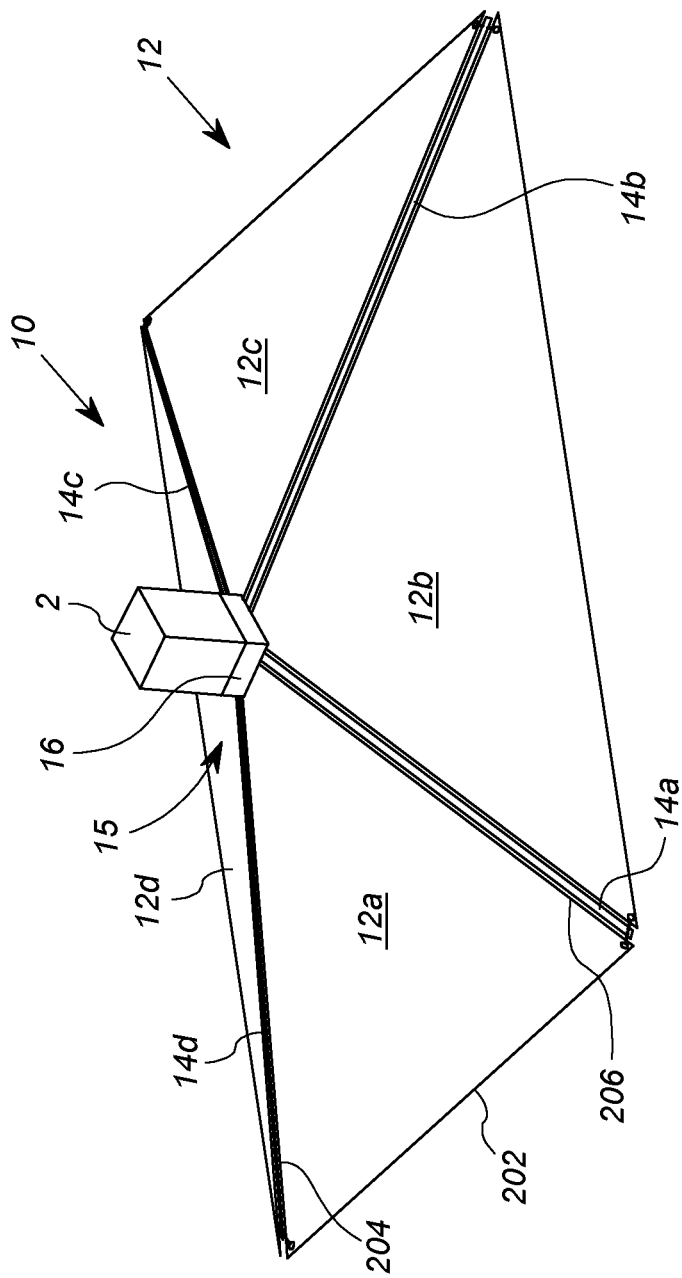
FIG. 1 shows a perspective view of a satellite having a deployed drag sail assembly according to a first embodiment.

FIG. 1 shows a perspective view of a satellite 2 having a drag sail assembly 10 according to a first embodiment with its drag sail 12 deployed for de-orbit. The drag sail 12 includes four triangular sail sections 12a-12d. The drag sail assembly 10 also includes four booms 14a-14d, and a sail deployment assembly 15 including an enclosure or housing 16. The housing 16 is operably connected to a satellite 2 using conventional and typically standardized methods. In this embodiment, the satellite 2 has the general form of a CubeSat, wherein the sail deployment assembly 10 is configured as an added module via a standard interface. The satellite 2 may have additional modules, not shown, but can include, for example, a solar panel module. The housing 16 is configured to stow the booms 14a-14d and the sail sections 12a-12d prior to deployment, and to house other elements of the sail deployment assembly 15, not shown in FIG. 1 (but see FIG. 5).

The exemplary embodiment described herein is designed to de-orbit 1U, 3U and 6U CubeSats, but it will be appreciated that the elements of the sail deployment assembly 10 and the sail 12 may be scaled to de-orbit significantly larger satellites.

Figure 2:
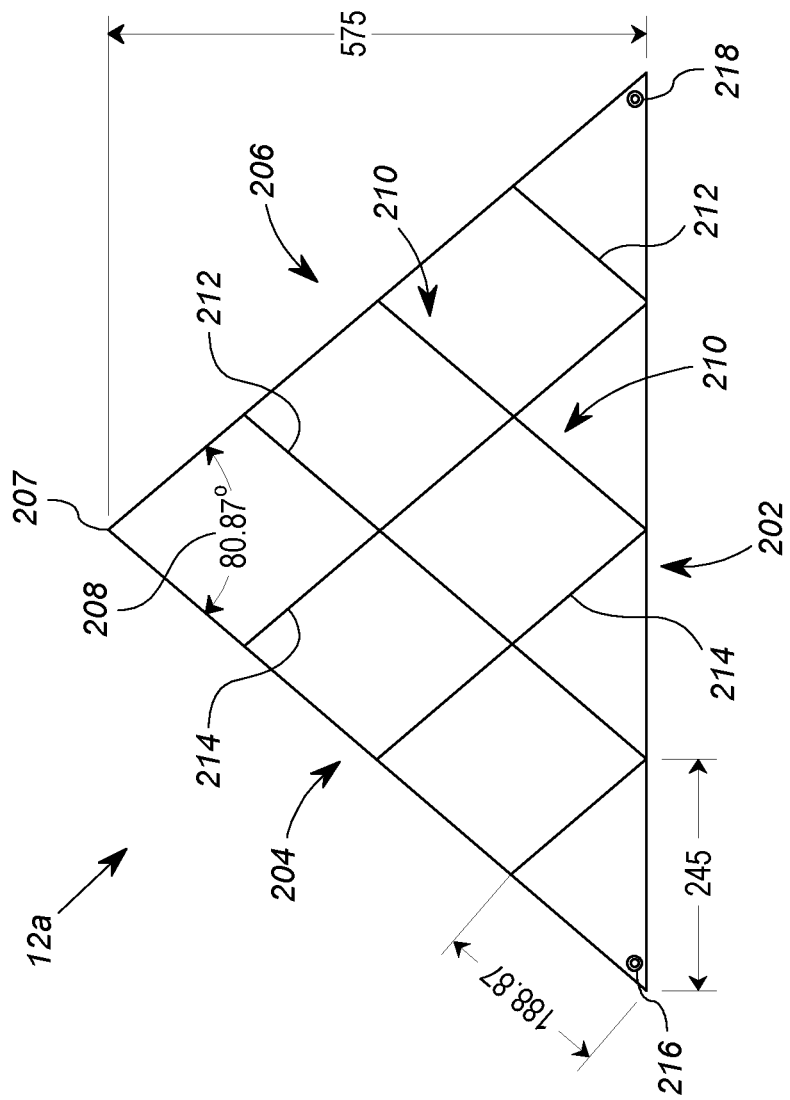
FIG. 2 shows a plain view of a sail segment used in the drag sail assembly of FIG. 1.

As shown in FIG. 1 each of the sails sections 12a-12d is triangular, and may suitably be constructed of CP1 or Corin polyimide membranes. In this example, the sail sections are made of 5 µm CP1, which are adequate for short mission durations. The division of the sail 12 into four sections 12a-12d mitigates the risk of tears due to micrometeoroids and orbital debris. FIG. 2 shows an exemplary sail section 12a, discussed further below. The other sail sections 12b-12d may suitably have an identical structure.

Each of the four booms 14a-14d are coupled at their respective proximal end 102a-102d to the sail deployment assembly 15. The four booms 14a-14d, when deployed, cooperate to operably support the sail sections 12a-12d in a square pyramid configuration, as shown in FIG. 1. The square pyramid preferably has an apex half angle (the angle between one of the booms 14a-14d and the center axis) of approximately 70°. As will be discussed in further detail below, the booms 14a and 14d connect to and support the sail section 12a. Similarly, the booms 14a and 14b connect to and support the sail section 12b, the booms 14b and 14c connect to and support the sail section 12c, and the booms 14c and 14d connect to and support the sail section 12d.

Each of the four booms 14a-14d has two configurations—a relatively flat first configuration when stowed in the housing 16 (non-deployed state), and an expanded second configuration when deployed, as shown in FIG. 1. In this embodiment, each of the booms 14a-14d has a deployed length of one meter.

FIGS. 3A and 3B show an exemplary embodiment of the boom 14a. FIG. 3A shows a cutaway view of the boom 14a in the first configuration in the non-deployed state, and FIG. 3B shows a cutaway of the boom 14a in the second configuration in the deployed state. The other booms 14b-14d may suitably have the same structures. Referring to FIGS. 3A and 3B contemporaneously, the boom 14a includes a plurality of spring elements 103, 105 disposed within a sleeve 107. As will be discussed below in detail in connection with FIG. 5, the boom 14a is wound onto the hub of the corresponding boom deployment assembly in a first configuration. In the wound state, the spring elements 103, 105 are compressed toward each other, as shown in FIG. 3a. The spring elements 103, 105 are biased to expand into a second configuration when the boom 14a is unwound from the hub. In the second configuration, central portions of the spring elements 103, 105 are spaced apart from each other. To this end, the spring elements 103, 105 may suitably be tape springs. In general, the boom 14a may take the form of the configuration described in Fernandez, J. M., Advanced Deployable Shell-Based Composite Booms for Small Satellite Structure Applications Including Solar Sails, 4$^{th}$ International Solar Sailing Symposium (2017).

With reference to FIG. 2, the sail section 12a is in the form of an isosceles triangle having a base 202 and two equal legs 204, 206. The legs 204, 206 extend from opposite ends of the base 202 to an apex 207, and define an apex angle 208 therebetween. In this embodiment, the length of the base 202 is 980 mm, the angle 208 is 80.8°, and the length of the legs 204, 206 is approximately 755 mm. The sail section 12a also includes a grid of ripstops 210 formed by intersecting lines 212, 214 of Kapton tape, which stops the propagation of tears. There is a design trade-off for the grid spacing because smaller grid sections reduce vulnerability to debris impact, but undesirably increase the thickness of the membrane. It will be appreciated that the sail section 12a is folded for stowing (in the housing 16) prior to deployment (i.e. during the useful life of the satellite 2). Accordingly, the lines 212, 214 of ripstops 210 should be designed to not be perpendicular to the folds to reduce stacking of the folds, which can increase size in the stowed position.

The ripstop pattern of FIG. 2 includes four lines 212 of Kapton tape parallel to the leg 204 and spaced apart by approximately 188 mm. The pattern also includes four lines 214 of tape parallel to the leg 206, also spaced apparat by approximately 188 mm. The ripstop pattern of FIG. 2 avoids stacking of folds when the sail section 12a is folded in a frog legs pattern as proposed by F. Dalla Vedova, et al., The Solar Sail Materials (SSM) Project—Status of Activities, *Advances in Space Research*, vol. 48., pp. 1922-1926.

The sail section 12a also includes a grommet 216 disposed substantially at the intersection of the leg 204 and the base 202, and a grommet 218 disposed substantially at the intersection of the leg 206 and the base 202. The grommets 216 and 218 are used to couple the ends of the base 202 to corresponding booms 14d, 14a. In particular, referring again to FIG. 1, the sail section 12a is coupled to the sail deployment assembly 15 at its apex 207. The grommets 216 and 218 are coupled, respectively to distal ends of booms 14d, 14a. In a similar manner, the sail sections 12b, 12c and 12d are coupled to combinations of booms 14a-14d as described above.

Figure 5:
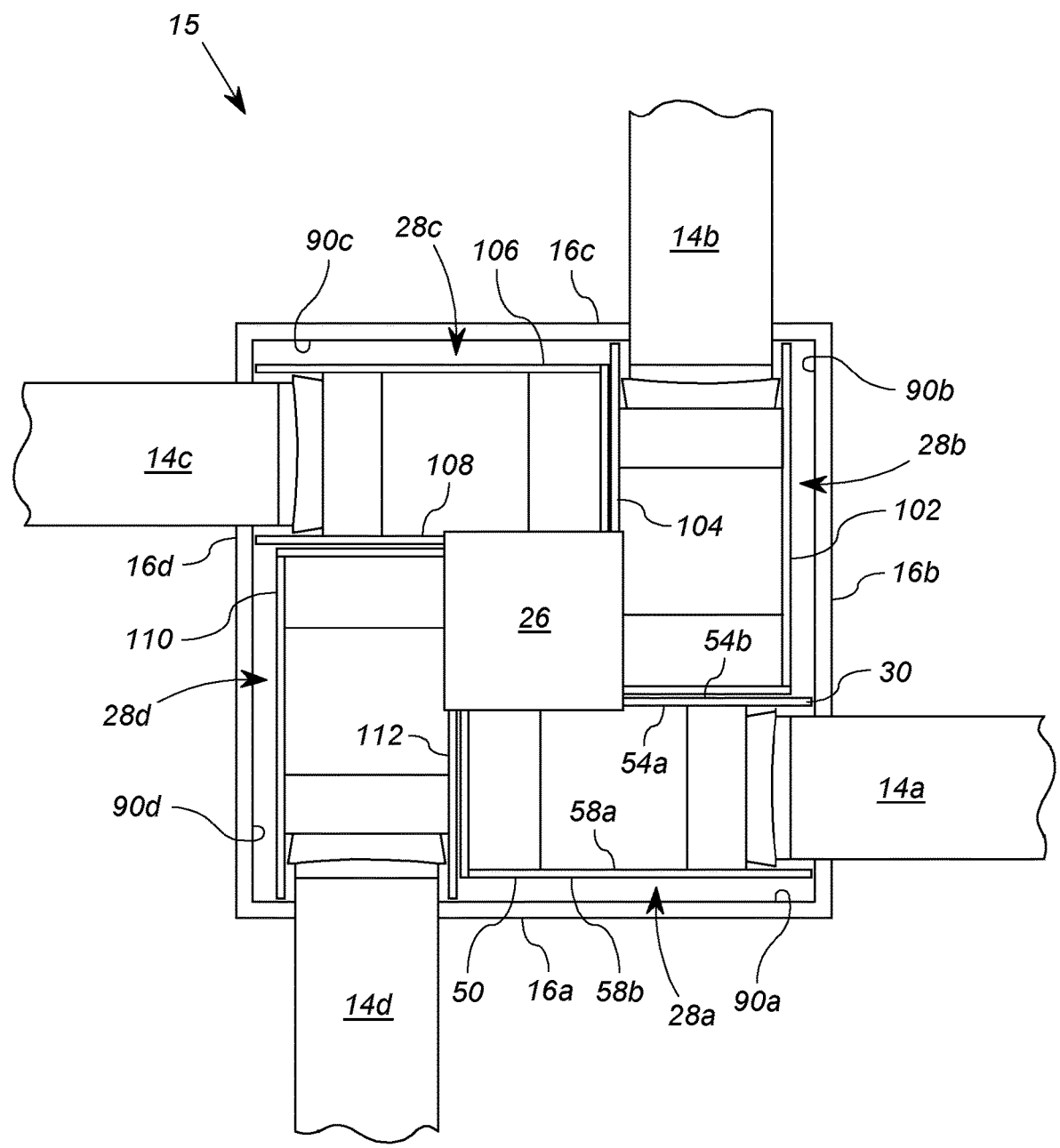
FIG. 5 shows a top plan view of a drag sail deployment assembly of the drag sail assembly of FIG. 1.

Referring back to FIG. 1, the housing 16 is in the form of an open top rectangular enclosure, shown in FIG. 5 in top plan view. In an alternative embodiment, a housing may be employed that has doors or lid sections to cover the sail deployment assembly 15 when it is stowed. By way of example, FIG. 4 shows an alternative embodiment of a housing 16' that includes two lid sections or doors 18, 20. The doors 18, 20 are hinged and open outward for deployment of the sail 12. The lid sections 18, 20 are closed in the non-deployed state as shown in FIG. 4.

FIG. 5 shows a top plan view of the sail deployment assembly 15 apart from the sail 12 for clarity of exposition. The housing 16 has four sides 16a, 16b, 16c and 16d, and generally defines an interior 24. The sail deployment assembly 15 includes, in addition to the housing 16, a motor drive circuit 26, and four boom deployment assemblies 28a-28d. FIG. 5 also shows the booms 14a-14d in fragmentary view, and partially paid out.

Figure 6:
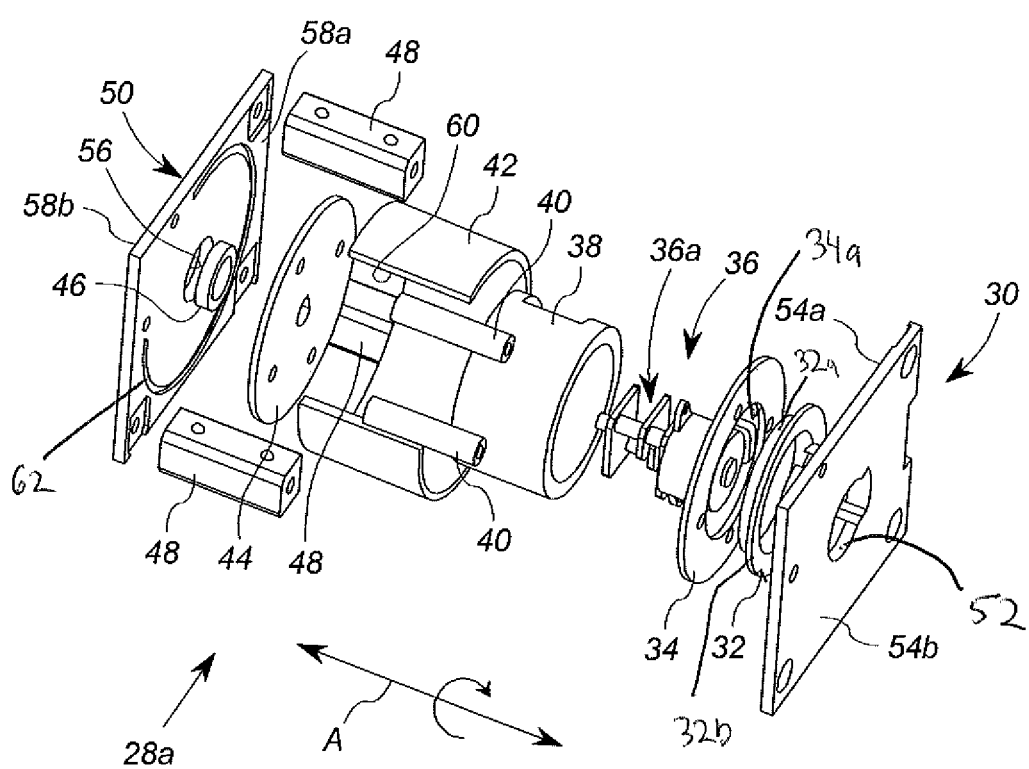
FIG. 6 shows an exploded perspective view of a boom deployment assembly of the drag sail deployment assembly of FIG. 5.

FIG. 6 shows an exploded perspective view of an exemplary embodiment of the boom deployment assembly 28a, which suitably is identical in structure to the boom deployment assemblies 28b, 28c and 28d. The boom deployment assembly 28a includes an inner frame 30, a Teflon bushing 32, an inner hub flange 34, a geared stepper motor 36, a hub 38, first and second rollers 40, a boom guide 42, an outer hub flange 44, a radial bearing 46, a plurality of frame posts 48, and an outer frame 50. As will be discussed below in greater detail, the hub 38, the inner hub flange 34, and the outer hub flange 44 form a reel or spool on which the boom 14a is wound (in the non-deployed state), and which rotates about an axis A with respect to the inner frame 30 and outer frame 50.

In particular, the inner frame 30 and outer frame 50 are similarly sized rectangular plates. The inner frame 30 includes an interior surface 54a, an exterior surface 54b (see also FIG. 5) and a central opening 52 through which wiring, not shown, for the stepper motor 36 may be fed. The surfaces 54a, 54b are generally planar and are aligned perpendicular to the axis A. The outer frame 50 similarly includes an interior surface 58a, an exterior surface 58b (see also FIG. 5), and a central opening 56 in which the radial bearing 46 is mounted. The surfaces 58a, 58b are generally planar and aligned perpendicular to the axis A.

The frame posts 48 couple the inner frame 30 to the outer frame 50 such that the plate exterior surfaces 54b, 58b are parallel to each other, and in turn, define the axial width of the boom deployment assembly 28a. To this end, each of the frame posts 48 may suitably be a rigid length of metal or polymer in the form of a beam, coupled at one end to the interior surface 54a of the inner frame 30, and coupled at the other end to the interior surface 58a of the outer frame 50.

The radial bearing 46 stands proud of the interior surface 58a of the outer frame 50 and is in the form of a ring. The radial bearing 46 engages a race, not shown, on the outer hub flange 44 to facilitate rotation of the outer hub flange 44 with respect to the outer frame 50. On the other side, the Teflon bushing 32 forms a bearing for the inner hub flange 32. To this end, the bushing 32 is a ring structure having a cylinder 32a and an annular flange 32b. The annular flange 32b is secured to the interior surface 54a of the inner frame 30. The inner hub flange 34 is a plate having an interior opening 34a that fits about the cylinder 32a and engages the annular flange 32b such that the inner hub flange 34 can rotate with respect to the bushing 32 and thus the inner frame 30. The inner hub flange 34 and outer hub flange 44 are rigidly coupled to the hub 38 and thus form the reel or spool that can rotate with respect to the inner frame 30 and outer frame 50. Although not shown in FIG. 5, the boom 14a is wound upon the hub 38 and rotatably paid out when deployed (as shown in FIG. 1). Each of the flanges 34, 44 have a radial width that exceeds that of the hub 38, as typical of any flange of a reel or spool.

The boom guide 42 is a C-shaped partially cylindrical rigid member surrounding most of the hub 38, but having a discontinuity or void 60 (thus forming the C-shape). The void 60 has an arcuate extent of less than 90° of the circumference otherwise defined by the boom guide 42. The void 60 has a linear or cord width sufficient to allow passage of the boom 14a in the second configuration, as shown in FIG. 3B. The boom guide 42 has an axial width extending substantially from the interior surface 54a of the inner frame 30 to the interior surface 58a of the outer frame 50. As shown in FIG. 5, the interior surface 58a has a corresponding shaped mounting channel 62 defined thereon, which receives and secures the boom guide 42 (when the frame posts 48 are secured). The interior surface 54a of the inner frame 30 has a similar channel, not shown.

The rollers 40 are rotatably mounted to and extend between the interior surfaces 54a and 58a. The rollers 40 are positioned at opposite arcuate ends of the void 60. It will be appreciated that the boom 14a, wound upon the hub 38, is to be paid out through the void 60 and between the rollers 40, which all act as guiding members.

Figure 7:
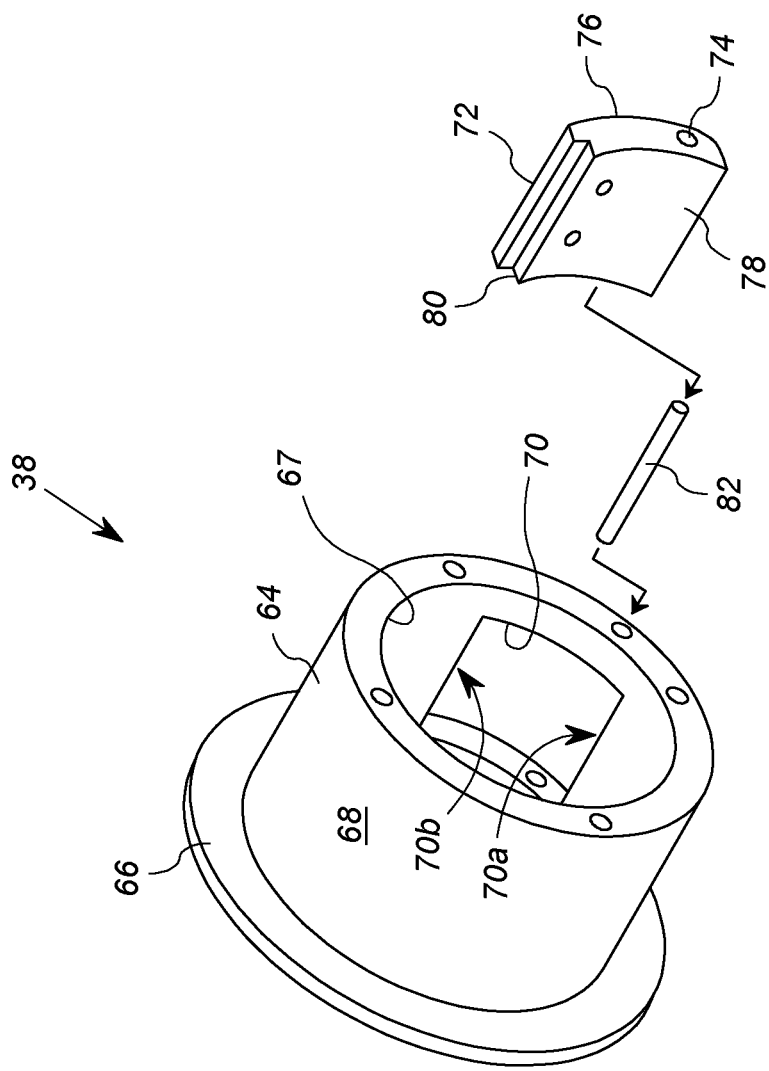
FIG. 7 shows an exploded perspective view of the hub of the boom deployment assembly of FIG. 6.

The hub 38 includes a hollow tubular member (tube 64) around which the boom 14a (not shown in FIG. 6) is wound in the non-deployed state. Although the hub 38 in this embodiment is cylindrical, it will be appreciated that hollow tubular members of other cross-sectional shapes may be employed, albeit with a reduction in space efficiency and/or an increased risk of boom damage. FIG. 7 shows an exploded, perspective view of the hub 38 apart from the remainder of the sail deployment assembly 15.

Figure 8B:
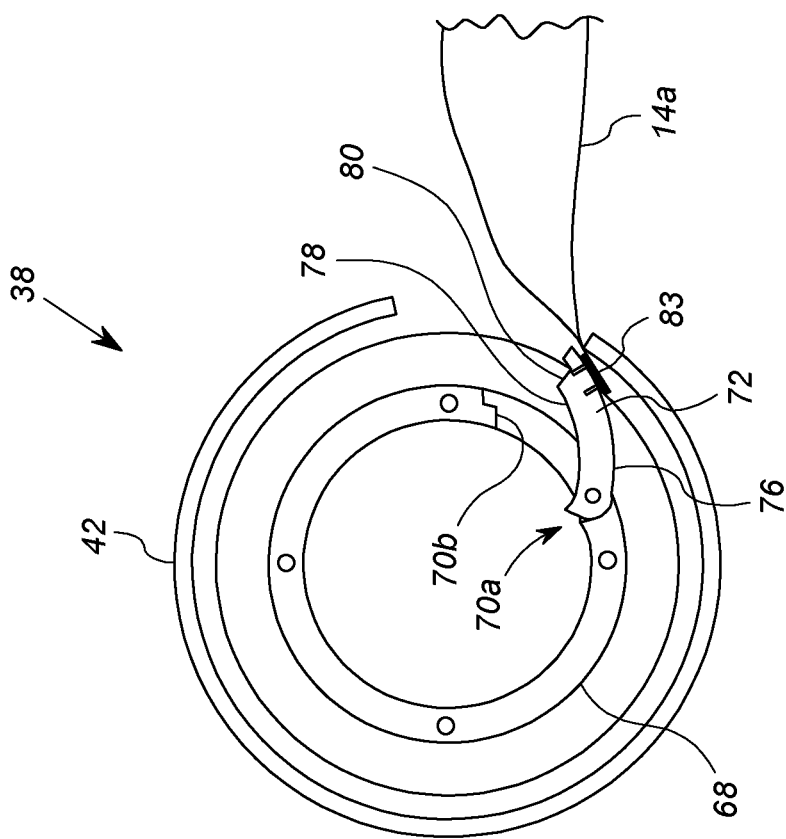
FIG. 8B shows a cutaway view of the hub of FIG. 7 with the hinged plate in a second position.
Figure 8A:
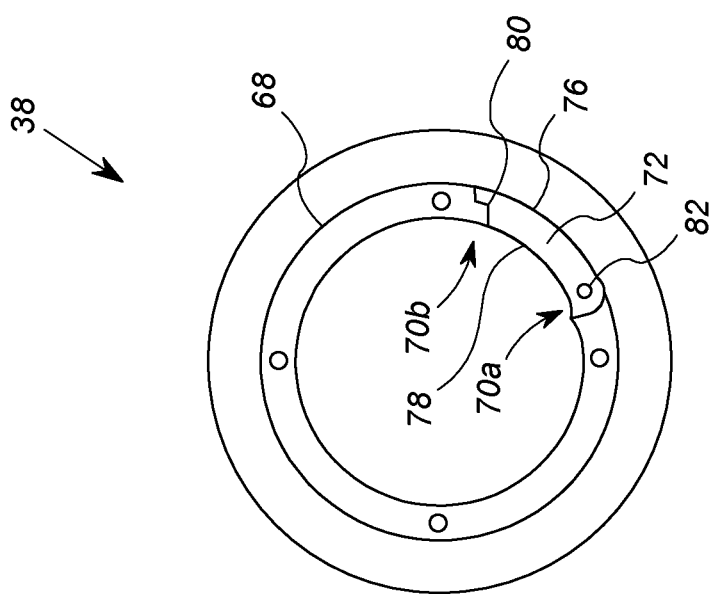
FIG. 8A shows a cutaway view of the hub of FIG. 7 with a hinged plate in a first position.

As depicted in FIG. 7, the hub 38 includes a hollow tube 64 having a flange 66 at one axial end, a hollow interior 67, and a hub surface 68 upon which the non-deployed boom 14a may be wound. The tube 64 includes an opening 70 that extends through the hub surface 68 into the hollow interior 67 of the tube 64. The opening 70 is approximately rectangular (within the context of the curvature of the tube 64), and has a length and width that is approximately one-half the axial length of the tube 64. The hub 38 further includes a hinged plate 72 rotatably affixed to the tube 64 and having a closed position and open position. Specifically, FIG. 8a shows a cutaway view of the hub 38 with the hinged plate 72 in the closed position, and FIG. 8b shows a cutaway view of the hub 38 with the hinged plate 72 in the open position. Also shown in FIG. 8b is a proximal end of the boom 14a (not shown in FIG. 8a), and the boom guide 42 for context.

As shown in FIGS. 7, 8A and 8B, the hinged plate 72 includes a proximal hinge opening 74, an outer surface 76, and inner surface 78 and a distal notch 80. A hinge pin 82 extends through the proximal hinge opening 74 and is secured in position in the tube 64 near a first circumferential end 70a of the opening 70. The hinged plate 72 thus can move arcuately about the hinge pin 82. The hinged plate 72 is configured to substantially cover the opening 70 of the tube 64 in the closed position, as shown in FIG. 8a. In the closed position, the outer surface 76 generally aligns and forms a continuation of the hub surface 68. To this end, the distal notch 80 engages a complementarily shaped feature in the second circumferential end 70b of the opening 70.

The boom 14a has a root 83 that is fastened to the outer surface 76 of the hinged plate 72. The root 83 of the boom 14a may be an extra length of the outer sleeve 107 without the spring elements 103, 105 disposed therein. Thus, only the end of the polymer sleeve 107 is coupled to the hinged member. Alternatively, either or both the spring elements 103, 105 may also be fastened (in flattened position as shown in FIG. 3A) to the outer surface 76 of the hinged plate 72.

In the open position, the hinged plate 72 rotates outward toward an end of the void 60 of the boom guide 42. In such a position, the hinged plate 72 cooperates with the boom guide 42 to cause, at least in part, the boom 14a to extend out of the enclosure in a predetermined direction once the boom 14a is fully paid out. Alternatively, the hinged plate 72 rotates outward until it engages one of the rollers 40, not shown in FIG. 8B. It will be appreciated that the hinged plate 72 may in other embodiments engage a different boom guiding feature or element for the same purpose. Without the hinged plate 72 the root 83 would likely be fastened directly to the cylindrical surface 68 of the hub 38, which would result in bending stress and possible failure after the boom 14a is deployed. The hinged plate 82 allows the root to be more linearly aligned with the boom 14a in both stored and deployed states, thereby reducing potentially damaging stress.

Referring again to FIG. 6, the stepper motor 36 is disposed within the interior 67 of the tube 64 of the hub 38. The motor 36 is operably connected to receive electrical stepper pulses from the motor drive circuit 26 (see FIG. 5), and rotate responsive thereto. The connection may be accomplished using wires extending through the inner frame opening 52. The stepper motor 36 has an output 150:1 reduction gear assembly 36a, which is operably coupled to rotated hub 38 via the outer hub flange 44.

Referring again to FIG. 5, the first boom deployment assembly 28a is secured within the housing 16 such that the exterior surface 58b of the outer frame 50 extends parallel to, adjacent to, but spaced apart from, the wall 16a. The outer frame 50 and inner frame 30 extend parallel to the wall 16a, and each extends from the second wall 16b to a little over halfway to the fourth wall 16d. The first boom deployment assembly 28a is oriented such that the boom 14a pays out in the direction (at least in part) toward the second wall 16b.

By contrast, the second boom deployment assembly 28b is oriented that the second boom 14b pays out in the direction (at least in part) toward the third wall 16c of the housing 16. To this end, the second boom deployment assembly 28b is secured within the housing 16 such its outer frame 102 and inner frame 104 extend parallel to the second wall 16b. The frames 102, 104 of the boom deployment assembly 28b extend from the third wall 16c to a little over halfway to the first wall 16a, where they engage the inner frame 30 of the first boom deployment assembly 28a.

Analogously, the third boom deployment assembly 28c is oriented such that the third boom 14c pays out in the direction (at least in part) toward the fourth wall 16d of the housing 16. To this end, the third boom deployment assembly 28c is secured within the housing 16 such its outer frame 106 and inner frame 108 extend parallel to the third wall 16c. The frames 106, 108 of the boom deployment assembly 28c extend from the fourth wall 16d to a little over halfway to the second wall 16b, where they engage the inner frame 104 of the second boom deployment assembly 28b.

Finally, the fourth boom deployment assembly 28d is oriented such that the boom 14d pays out in the direction (at least in part) toward the first wall 16a of the housing 16. To this end, the boom deployment assembly 28d is secured within the housing 16 such its outer frame 110 and inner frame 112 extend parallel to the fourth wall 16c. The frames 110, 112 of the fourth boom deployment assembly 28d extend from the first wall 16a a little over halfway to the third wall 16c, where they engage the inner frame 108 of the third boom deployment assembly 28c. The inner frame 112 also engages the ends of the frames 30, 50 of the first boom deployment assembly 28a.

The space defined between the outer frame 50 of the first boom deployment assembly 28a, the wall 16a, the wall 16b and the inner frame 112 of the fourth boom deployment assembly 28d forms a first compartment 90a for storing the first sail segment 12a in the non-deployed state. A similar space is defined between the outer frame 102 of the second boom deployment assembly 28b, the wall 16b, the wall 16c and the inner frame 30 of the first boom deployment assembly 28a, which forms a second compartment 90b for storing the second sail segment 12b in the non-deployed state. A similarly sized third compartment 90c for storing the third sail segment 12c is defined between the outer frame 106 of the third boom deployment assembly 28c, the wall 16c, the wall 16d and the inner frame 104 of the second boom deployment assembly 28b. A last, similarly sized fourth compartment 90d for storing the fourth sail segment 12d is defined between the outer frame 110 of the fourth boom deployment assembly 28d, the wall 16d, the wall 16a and the inner frame 108 of the third boom deployment assembly 28c.

To allow scalability to booms greater than one meter, and even exceeding 10 meters in deployed length, the, booms 14a-14d are paid out using individual motors, such as the motor 36 of FIG. 6. All of the motors of the boom deployment assemblies 28a-28d, are driven by the single motor drive circuit 26.

Figure 9:
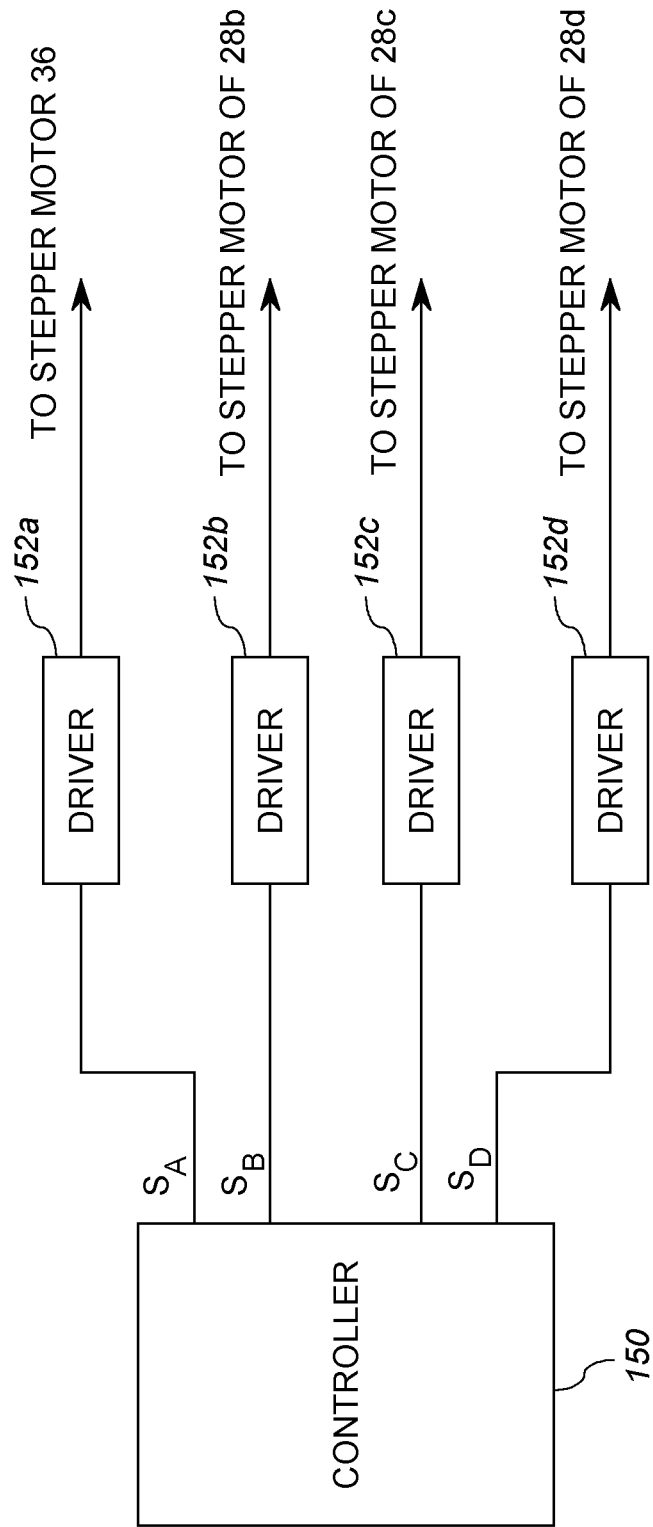
FIG. 9 shows a schematic block diagram of the motor drive circuit of the drag sail deployment assembly of FIG. 5.

A schematic of the motor drive circuit 26 of FIG. 5 is shown in FIG. 9. The motor drive circuit 26 includes a microcontroller 150 configured to generate four motor pulse signals $S_A$, $S_B$, $S_C$, and $S_D$, each having a sign + for forward drive, and a sign − for reverse drive. The microcontroller 150 is operably connected to provide the four motor pulse signals $S_A$, $S_B$, $S_C$, and $S_D$ to four drive circuits 152a, 152b, 152c and 152d. The drive circuit 152a is configured to generate drive pulse signals based on signal $S_A$ to drive the stepper motor 36. The drive circuit 152a is operably connected to provide the pulse signals to the stepper motor 36 to cause the stepper motor 36 to rotate. The drive circuits 152b-152d are similarly configured, and operably connected to provide drive signals based on, respectively, $S_B$, $S_C$, and $S_D$ respectively, the stepper motors of respective boom deployment assemblies 28b-28d. Each of the signals $S_A$, $S_B$, $S_C$, and $S_D$ may be different, such that the deployment of each boom 14a-14d may be individually controlled.

In operation, the sail assembly 10 is in stowed configuration (not deployed) during the normal operation of the satellite 2. In the stowed configuration, the sail segments 12a-12d are stored in the respective compartments 90a-90d, the booms 14a-14d are in flat configuration (FIG. 3a) and rolled onto the hubs (e.g. hub 38) of the boom deployment assemblies 28a-28d. In embodiments where the housing 16' is used, the lid sections 18, 20 of the housing 16' are closed during normal operation of the satellite 2.

At or near the end of the mission of the satellite 2, the satellite 2 and/or other circuitry in the motor drive circuit 26, not shown, causes the motor drive circuit 26 to rotate the stepper motors (e.g. stepper motor 36) of the boom deployment assemblies 28a-28d. If the alternative housing 16' of FIG. 4 is used, then the circuitry also causes the lid sections 18, 20 to open using conventional methods.

Regardless of the housing used, the stepper motor 36 of the boom deployments assembly 28a causes the hub 38 to rotate, thereby paying out the boom 14a. The boom deployment assemblies 28b-28d pay out the respective booms 14b-14d in the same way. The booms 14a-14d expand to the second configuration, as shown in FIG. 3b. As the distal ends of the booms 14a-14d extend outward, they pull the sail segments 12a-12d out to form the deployed square pyramid pattern shown in FIG. 1.

As discussed above, the design of FIGS. 1-9 may be scaled to larger satellites. For example, a 180 kg satellite may be de-orbited within a 25-year window using 10 meter booms, which may be deployed by a suitably scaled version of the sail deployment assembly 10.

Figure 10B:
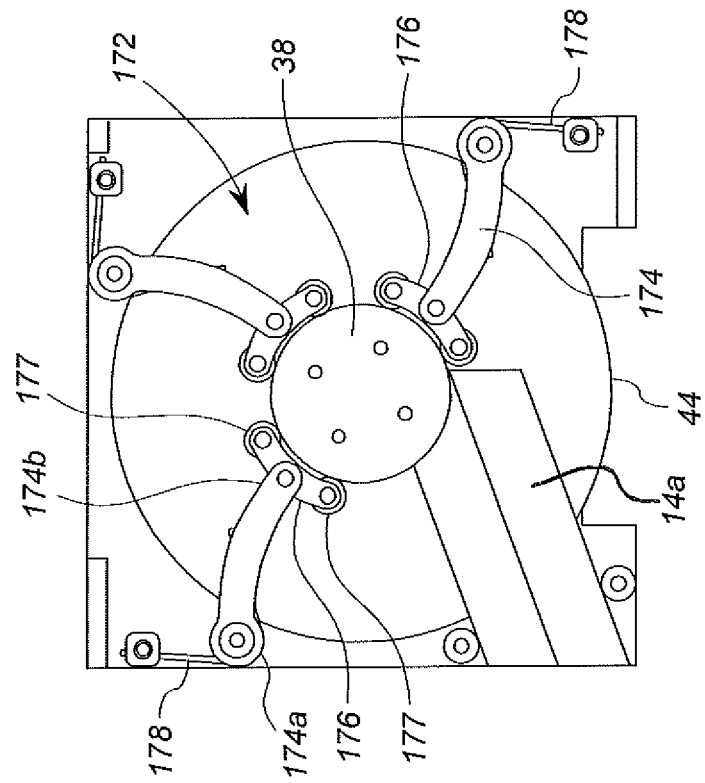
FIG. 10B shows a representative plan view of a portion of the alternate boom deployment assembly of FIG. 10A, wherein the boom is paid out.
Figure 10A:
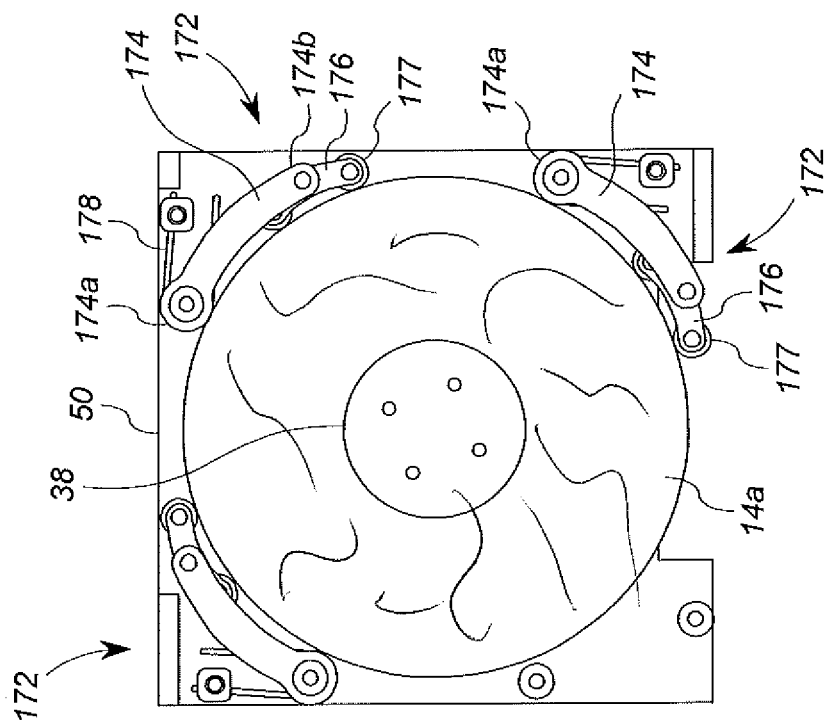
FIG. 10A shows a representative plan view of a portion of an alternate boom deployment assembly that may be used drag sail deployment assembly of FIG. 5, wherein the boom is stowed.

In some cases, it may be necessary to employ anti-blooming features instead of the boom guide 42 of FIG. 6. In particular, with longer booms having the configuration shown in FIGS. 3A and 3B, the stored spring energy in the spring elements 103, 105 can cause blooming during the payout, which can create difficulties. FIGS. 10A and 10B illustrate a top plan representative view of a portion of a boom deployment system 170 that has an alternative anti-blooming arrangement to address such issues. The boom deployments system 170 may have the same structure as the deployment system 28a discussed above, except as noted below.

FIG. 10A shows the deployment system 170 when the boom 14a is stowed, and FIG. 10b shows the deployment system 170 when the boom 14a is paid out. The anti-blooming arrangement includes a plurality of tensioned arm assemblies 172 disposed about the hub 38. Each tensioned arm assembly 172 includes a rocker arm 174 rotatably coupled at a first end 174a to the outer frame 50 and/or the inner frame 30, not shown in FIGS. 10A and 10B (see FIG. 6). The second end 174b of the arm 174 is coupled to at least one roller 177. In this embodiment, the second end of the arm 174 is coupled to a rocker hand 176, which in turn includes at least one roller 177. More specifically, the rocker hand 176 is curved bar or set of bars having a roller 177 at both ends. The intermediate portion of the bar of the rocker hand 176 is rotatably attached to the second end 174b of the rocker arm 174.

Each tensioned arm assembly 172 further includes a torsion spring 178 which biases the second end 174b of the rocker arm 174 toward the hub 38. The biasing force causes the rollers 177 of the rocker hand 176 to engage the outermost portion of the boom 14a wound on the hub 38. The rocker hand 176 pivots to allow both rollers 177 to seat on the outermost layer of the boom 14a. As a result, the biasing force causes the rollers 177 of the rocker hand 176 to apply inward pressure on the outermost portion of the boom 14a on the hub 38 during most or all of the pay out of the boom 14a. The pressure prevents blooming that can otherwise occur in the spring-loaded boom 14a.

It will be appreciated that the above-described embodiments are merely illustrative, and that those of ordinary skill in the art may readily devise their own implementations and modifications that incorporate the principles of the present invention and fall within the spirit and scope thereof.

What is claimed is:

1. A drag sail deployment assembly, comprising:
   an enclosure having first, second, third and fourth boom deployment assemblies, each boom deployment assembly having, a hub configured to hold a wound boom and to rotatably pay out the wound boom, the hub having a hollow interior;
   a motor disposed at least in part within the hollow interior, the motor operably coupled to rotate the hub;
   first, second, third and fourth retractable booms, each of the first, second, third and fourth retractable booms associated with a corresponding one of the first, second, third and fourth boom deployment assemblies, each boom comprising a plurality of spring elements disposed within a sleeve, each boom wound onto the hub of the corresponding boom deployment assembly in a first configuration wherein the spring elements are compressed toward each other, and each boom configured to expand into a second configuration wherein central portions of the spring elements are spaced apart from each other when the boom is unwound from the hub of the corresponding boom deployment assembly; and
   wherein the first boom deployment assembly further comprises a hinged plate pivotally affixed to the hub, the hinged plate further secured to an end of the first retractable boom.

2. The drag sail deployment assembly of claim 1, wherein the hinged plate is configured to cause the end of the first retractable boom to extend out in a predetermined direction with respect to the enclosure.

3. The drag sail deployment assembly of claim 2, wherein at least one roller of the first boom deployment assembly stops the rotational movement of the hinged plate.

4. The drag sail deployment assembly of claim 1, wherein the hinged plate has distal end having a first position and a second position, wherein in the first position the distal end engages a part of a hub surface around which the boom is wound, and wherein in the second position the distal end is spaced apart from the part of the hub surface around which the boom is wound.

5. The drag sail deployment assembly of claim 4, wherein the hub includes a hollow tubular member having an opening, and wherein the hinged plate covers the opening in the first position.

6. The drag sail deployment assembly of claim 1, wherein the first boom deployment assembly includes a boom guide in the form of a portion of a cylinder having a void through which the boom extends, the portion of the cylinder surrounding a majority of a circumference of the hub.

7. The drag sail deployment assembly of claim 6, wherein the void extends less than one third of the circumferential distance of the portion of the cylinder.

8. The drag sail deployment assembly of claim 1, further comprising a motor drive circuit configured including a controller and four drive circuits, each drive circuit operably coupled to provide drive signals to the motor of a corresponding boom deployment assembly.

9. The drag sail deployment assembly of claim 8, further comprising a reduction gear set configured to provide at least 100 to 1 gear reduction.

10. The drag sail deployment assembly of claim 1, further comprising a first arm rotatably attached to a frame, the first arm operably coupled to at least one roller, and wherein the arm is spring-based to rotate toward the hub, the at least one roller configured to engage the boom.

11. The drag sail deployment assembly of claim 10, wherein the first arm is operably coupled to the at least one roller via a rocker hand.

12. A drag sail assembly, comprising:
   an enclosure having first, second, third and fourth boom deployment assemblies, each boom deployment assembly having,
      a hub configured to hold a wound boom and to rotatably pay out the wound boom, the hub having a hollow interior;
      a motor disposed at least in part within the hollow interior, the motor operably coupled to rotate the hub;
   first, second, third and fourth retractable booms, each of the first, second, third and fourth retractable booms associated with a corresponding one of the first, second, third and fourth boom deployment assemblies, each boom comprising a plurality of spring elements disposed within a sleeve, each boom wound onto the hub of the corresponding boom deployment assembly in a first configuration wherein the spring elements are compressed toward each other, and each boom configured to expand into a second configuration wherein central portions of the spring elements are spaced apart from each other when the boom is unwound from the hub of the corresponding boom deployment assembly; and
   first, second, third and fourth sail segments coupled to respective pairs of the first, second, third and fourth retractable booms;
   wherein the first boom deployment assembly further comprises a hinged plate rotatably affixed to the hub, the hinged plate further secured to an end of the first retractable boom.

13. The drag sail deployment assembly of claim 12, wherein the hinged plate is configured to cause the end of the first retractable boom to extend out in a predetermined direction with respect to the enclosure.

14. The drag sail deployment assembly of claim 13, wherein the first boom deployment assembly includes a boom guide in the form of a portion of a cylinder having a void through which the boom extends, the portion of the cylinder surrounding a majority of a circumference of the hub.

15. The drag sail deployment assembly of claim 12, wherein the first boom deployment assembly includes a boom guide in the form of a portion of a cylinder having a void through which the boom extends, the portion of the cylinder surrounding a majority of a circumference of the hub.

16. The drag sail deployment assembly of claim 15, wherein the void extends less than one third of the circumferential distance of the portion of the cylinder.

\* \* \* \* \*